US007009175B2

(12) United States Patent
Hansel et al.

(10) Patent No.: US 7,009,175 B2
(45) Date of Patent: Mar. 7, 2006

(54) METHOD FOR OBTAINING AN OUTPUT ION CURRENT

(76) Inventors: Armin Hansel, Furterzaunweg 6, 6020 Innsbruck (AT); Armin Wisthaler, Luis-Zuegg-Strasse 12/3/14, 6020 Innsbruck (AT)

( * ) Notice: Subject to any disclaimer, the term of this patent is extended or adjusted under 35 U.S.C. 154(b) by 0 days.

(21) Appl. No.: 11/000,412

(22) Filed: Dec. 1, 2004

(65) Prior Publication Data

US 2005/0178956 A1 Aug. 18, 2005

(30) Foreign Application Priority Data

Dec. 16, 2003 (AT) ............................ A 2019/2003

(51) Int. Cl.
*H01J 49/42* (2006.01)
*H01J 44/10* (2006.01)
*H01M 8/02* (2006.01)

(52) U.S. Cl. .................. 250/282; 250/281; 250/423 R; 250/424

(58) Field of Classification Search ..................... None
See application file for complete search history.

(56) References Cited

U.S. PATENT DOCUMENTS 6,753,523 B1 * 6/2004 Whitehouse et al. ....... 250/292
2005/0056776 A1 * 3/2005 Willoughby et al. ........ 250/281

FOREIGN PATENT DOCUMENTS

| | | |
|---|---|---|
| AT | 001 637 | 8/1997 |
| AT | 403 214 | 12/1997 |
| AT | 406 206 | 3/2000 |
| EP | 0 000 865 | 3/1979 |

* cited by examiner

*Primary Examiner*—John R. Lee
*Assistant Examiner*—Bernard E. Souw
(74) *Attorney, Agent, or Firm*—Wenderoth, Lind & Ponack, L.L.P.

(57) ABSTRACT

In a method for obtaining an output ion current substantially comprised of only a single ionic species, ions formed in the ionization of a source gas in an ionization region (A) and/or ions extracted from the ionization region (A) are allowed to react in a region (A, B, C), in which is located a source gas, until substantially only one or several source ionic species are present, which do not react with the source gas. To a reaction region (C) located outside of the ionization region (A) and in which ions of the one or several source ionic species are present, a reactant gas, differing from the source gas, is supplied, which reacts with the ions of the one or several source ionic species, and the ions of the one or several source ionic species are substantially converted into the single ionic species forming the output ion current.

13 Claims, 1 Drawing Sheet

METHOD FOR OBTAINING AN OUTPUT ION CURRENT

BACKGROUND OF THE INVENTION a) Field of the Invention

The invention relates to a method for obtaining an output ion current substantially comprised of a single ionic species, in which ions formed during the ionization of a source gas in an ionization region and/or ions extracted from the ionization region are allowed to react in a region, in which is disposed a source gas, until substantially only one or several source ionic species, which do not react with the source gas, are present.

b) Description of Related Prior Art

Such a method is disclosed for example in AT 001 637 U1. In this document a method for obtaining an ion current is described, which is substantially comprised of $H_3O^+$ ions. For this purpose water vapor is ionized by means of an ion source in an ionization region, whereby various ions are formed ($O^+$, $OH^+$, $H^+$, $H_2^+$, . . . ). These ions are extracted by means of a weak electric field into a region located outside of the ionization region and are kept in this region, in which $H_2O$ is present at a pressure above 0.01 Torr, until those ions, initially differing from $H_3O^+$, have also been converted into $H_3O^+$ ions in secondary reactions. In this region and/or in a region adjoining thereon, the ion current is furthermore guided through an electric field, whose field strength is of adequate magnitude such that $H_3O^+.(H_2O)_n$ cluster ions, formed through association reactions between two successive collisions with neutral collision partners have gained sufficient kinetic energy in order for these collisions to be largely dissociative. The build-up of such cluster ions is thereby prevented or largely canceled. To improve these dissociation reactions, an additional gas, such as Ar, Kr or $N_2$, which serves as a collision partner for the cluster ions but does not enter into chemical reactions with the $H_3O^+$ ions can also be added to the $H_2O$.

Such an ion current, substantially comprised of $H_3O^+$, can be utilized in particular as a primary ion current for the chemical ionization of a sample gas through proton transfer reactions, in order to analyze the ions formed of the sample gas mass-spectrometrically. This proton transfer reaction mass spectrometry, referred to as PTR-MS, is described in AT 001 637 U1 and the references cited therein. Involved here is a special type of ion molecule reaction mass spectrometry (IMR-MS), which is also described in AT 001 637 U1 and the references cited therein.

AT 406 206 B, moreover, discloses a method with a process sequence analogous to that known from AT 001 637 for obtaining an ion current, substantially comprised of $NH_4^+$ ion. As the source gas for this purpose ammonia ($NH_3$) is ionized and, after extraction from the ionization region, the ions formed are allowed to rest in a region at an ammonia pressure above 0.01 Torr (1.33 Pascal) until an ion current, substantially only comprised of $NH_4^+$ ions, is formed (and for the prevention or cancellation of the build-up of cluster ions, again, an electric field strength sufficient for inducing collisions is applied).

From AT 403 214 B is furthermore known to introduce different source gases into an ion source and through a filter device to filter all primary ionic species, generated in the ion source from various neutral atoms or molecules of the source gases, except one primary ionic species. The remaining primary ionic species is introduced into the reaction chamber. In the reaction chamber it is allowed to react with a sample gas, and the reaction products formed through ion-molecule reactions (for example proton transfer reactions) are analyzed in a mass spectrometer. Of disadvantage here is the additionally required mass spectrometer forming the filter device.

Obtaining output ion currents through the methods disclosed in AT 001 637 U1 or AT 406 206 B comprised of only a single ionic species without such mass-spectrometric filtering, such as is known from AT 403 214 B, is only possible for some ionic species, in particular for $H_3O^+$ ions, $NH_4^+$ ions and $H_3^+$ ions. Only in a few source gases output ion currents are formed in the manner described in these two documents, which substantially are comprised of only a single ionic species. Such source gases are described in the literature as "CI Reagent Gases".

EP 000 865 A1 describes the analysis of a sample gas which, for this purpose, is ionized through ion-molecule reactions. Chemical ionization of the sample gas takes place in a chamber (conventionally also referred to as "drift tube"), here described as ionization chamber. A partially ionized primary gas from an ion source is introduced into the ionization chamber, which is here implemented as a gas discharge chamber. In addition to the sample gas, into the ionization chamber is also introduced a reactant gas which reacts with the ions entering the ionization chamber from the ion source and, on his part, ionizes the sample gas. Consequently, in the ionization chamber is present a mixture of the more or less ionized components of the primary gas, reactant gas and sample gas. Obtaining an output ion current comprised substantially of only a single ionic species, is not disclosed in this document. To the outlet opening of the ionization chamber are conducted the ionized primary particles as well as also the reactant gas and sample ions.

OBJECT AND SUMMARY OF THE INVENTION

One important objective of the invention is expanding the spectrum of generatable output ion currents, which are substantially comprised of only a single ionic species, without mass-spectrometric filtering (as described in AT 403 214 B) being required for this purpose.

According to the invention this is achieved through a method, in which during the ionization of a source gas ions formed in an ionization region and/or ions extracted from the ionization region are allowed to react in a region, in which a source gas is present, until substantially only one or several source ionic species are present which do not react with the source gas, and in which, furthermore, to a reaction region, located outside of the ionization region and in which ions of the one or several source ionic species are present, a reactant gas different from the source gas is supplied, which reacts with the ions of the one or several source ionic species, and the ions of the one or several source ionic species are substantially converted into the single ionic species forming the output ionic stream.

Through the method according to the invention it is in particular possible to generate output ion currents substantially comprised of only one single ionic species, which, with the direct addition of the reactant gas into the primary ionization region, would not be generated in this formdue to the different species (ions, electrons, atoms, molecules, radicals, excited atoms, activated molecules). If, for example, nitrogen ($N_2$) were to be added to the source gas $H_2$, in the plasma of the primary ionization region neutral $NH_3$ would be formed (cf.: ref 1: Fuji et al., Int. J. Mass Spectrom. 216, 169, 2002). Consequently, $H_3^+$ would preferably react with $NH_3$ in the reaction $H_3^+ + NH_3 \rightarrow NH_4^+ + H_2$ and the generation of an $N_2H^+$ output ion current would not be possible (as will be explained later).

The addition of the reactant gas into a reaction region spatially separate from the primary ionization space, additionally, has the advantage that it is also possible to add gases whose presence would be problematic in the primary ionization region, for example NO in filament ion sources (leads to rapid filament breakage) or carbon-containing gases in plasma ion sources (leads to carbon depositions).

Suitable measures are preferably taken such that a backflow of the reactant gas from the reaction region into the ionization region is substantially prevented, i.e. less than 10%, preferably less than 5% of the partial pressure in the ionization region should be due to the reactant gas or the products formed therefrom. To this end, for example, the spaces forming the ionization region and the reaction region can be separated by one or more partitioning walls, and in one of the partitioning walls an aperture opening can be located, and, through appropriate pumping devices, a gas flow can be maintained in the direction from the ionization region to the reaction region through at least one of the aperture openings. Intermediate pumping-down between the regions is also conceivable and possible.

In principle—at least in some application cases—it would be conceivable and possible to conduct the ions extracted from the ionization region directly into the reaction region. But it is preferred to conduct the ions extracted from the ionization region initially into an intermediate space, in which they are allowed to rest until the ions, initially still different from the one or several source ionic species, have become substantially (i.e. more than 90%, preferably more than 95%) converted into ions of the one or several source ionic species. From this intermediate region subsequently ions of the one or several source ionic species can be extracted into the reaction region, in which, with the addition of the reactant gas, they are converted (i.e. more than 90%, preferably more than 95%) into the single ionic species of the output ion current.

If the extraction of ions takes place from the ionization region directly into the reaction region, the reactions of the ions, formed during the ionization, into the ions of the one or several source ionic species have substantially already taken place in the ionization region or these reactions take place mainly or partially in the reaction region. For this purpose source gas must be present at an adequate pressure (for example more than 1 Pascal) in the reaction region. Furthermore, the reactant gas should, as much as possible, not react with ions which have not yet been converted into ions of the one or several source ionic species. In some combinations of source gases and reactant gases this is the case. It would be conceivable and possible in special cases, to convert impurity ionic species (which react with the reactant gas to form undesirable ionic species) of the primary ions and/or secondary products into nonimpurity ions through the addition of a suitable addition gas.

As the source gas a pure gas or a gas mixture can be employed. The use of a pure gas is preferred for the reactant gas, however, the use of gas mixtures would also be conceivable and possible.

In the following further advantages and particulars of the invention will be explained in conjunction with the embodiment example depicted in the enclosed drawing, based on which further objectives of the invention are evident.

BRIEF DESCRIPTION OF THE DRAWING

In the enclosed drawing

DESCRIPTION OF THE PREFERRED EMBODIMENT EXAMPLES

Figure 1:
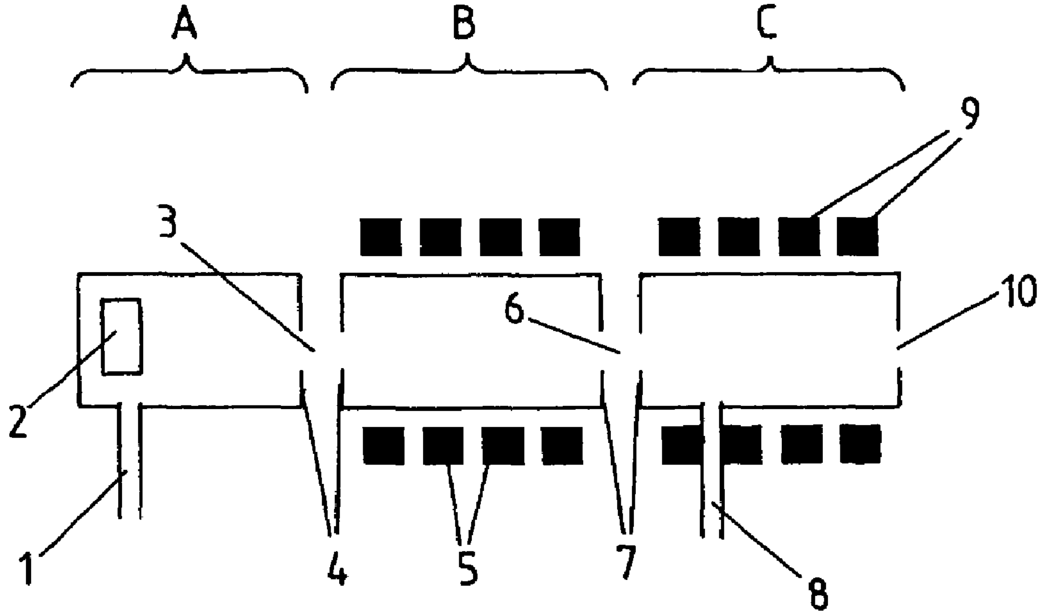
FIG. 1 depicts a highly schematic illustration of a device, with which the method according to the invention can be carried out.

The device depicted schematically in FIG. 1 for carrying out the method according to the invention comprises three regions. To the primary ionization region A a source gas is supplied through a feed inlet 1. In the ionization region A an ion source or ionization device 2 is disposed which is not depicted in detail here. The primary ionization of the source gas takes place for example through electron emission from a filament, through ionizing radiation (for example $\alpha$ particles), through an electric discharge or other ionization processes. The choice of the primary ionization process is irrelevant to the subject matter of the invention.

As the source gas is utilized a pure gas, for example hydrogen ($H_2$), or a gas mixture, for example of $H_2$ and argon (Ar) or nitrogen ($N_2$) and dinitrogen monoxide ($N_2O$). Total pressure and partial pressures depend on the selection of the ionization process (low-pressure or high-pressure ion source).

In the primary ionization region A a multiplicity of species are present (ions, electrons, atoms, molecules, radicals, excited atoms, activated molecules).

By applying an electric field of suitable polarity, either positive or negative ions are extracted into the intermediate region B through an aperture opening 3 in a partitioning wall 4. As a rule, the generated ion current is not selective, i.e. it is in general comprised of various ionic species:

In the case $H_2$ is used as the source gas, the extractable positive ion current is comprised of singly charged ions of $H^+$, $H_2^+$, $H_3^+$ and $H_3^+.H_2$.

In the case a mixture of $H_2$ and Ar is utilized, the extractable positive ion current is comprised of singly charged ions of $Ar^{+, Ar}{}_2^+$, $ArH^{+, ArH}{}_2^+$, $ArH_3^+$, $H^+$, $H_2^+$, $H_3^+$, $H_3^+.H_2$.

In the case a mixture of $N_2$ and $N_2O$ is used, the extractable negative ion current is primarily comprised of $O^-$ ions, with traces of $NO^-$ ions (cf. ref2: A. P. Bruins et al., Adv. Mass Spectrom. 7, 355, 1978).

The relative fractions of the extractable ionic species listed by example depend on several source gas parameters (total pressure of the source gas or partial pressures of the different source gas components, temperature, and the like). Depending on the ion source and the source gas, multiply charged ions can also occur and be extracted in addition to singly charged ions.

To the intermediate region B is supplied the source gas (total pressure >0.01 mbar, particle gas density $N_B$). The supply can take place through source gas flowing from the ionization region A into the intermediate region. But it can also be a separate feed inlet not depicted in the FIGURE. The pressure of the source gas in the intermediate region B can be similar or identical to the pressure of the source gas in the ionization region A. In the intermediate region B an electric field of strength $E_B$ is applied through electrodes 5. The intermediate region is at a temperature $T_B$.

In the intermediate region B the ions extracted from the primary ionization region A interact with the source gas. The spectrum of interactions comprises binary ion-molecule reactions (for example $H_2^+ + H_2 \rightarrow H_3^+ + H$), ternary ion-molecule reactions (for example $H^+ + H_2 + H_2 \rightarrow H_3^+ + H_2$), collision induced dissociation reactions (for example $H_3^+.H_2+H_2 \rightarrow H_3^++H_2+H_2$), as well as excitation and de-excitactions reactions (for example $(H_2^+)^*+H_2 \rightarrow H_2^++H_2$).

The parameters $E_B/N_B$ and $T_B$ define the reaction conditions, i.e. by varying these parameters it is possible to favor certain reaction channels or to suppress them.

Through the appropriate choice of the reaction conditions the ion current, comprised of numerous ionic species and extracted from the primary ionization region A, is converted into a selective ion current of substantially one ionic species not reacting with the source gas or an ion current comprised substantially of several ionic species not reacting with the source gas. This one or several ionic species not reacting with the source gas, or expressed differently, they are "stable" with respect to the source gas, are referred to in this document as "source ionic species". At the outlet of the intermediate region B, to which the ion current is conducted through the electric field $E_B$, the ion current is preferably comprised of at least 90% of the one or several source ionic species, and a value of at least 95% is especially preferred.

At the outlet of the intermediate region the fraction of ions of the source ionic species could also be lower than the specified value of preferably 90% or 95%, for example if at the outlet of the intermediate region a fraction of cluster ions (for example $H_3^+.H_2$) is still present, which is only converted in the reaction region C, described below, through dissociation reactions into ions of the one or several source ionic species (plus neutral source gas) by applying in the reaction region C an electric field of adequate field strength for carrying out the requisite collision-induced dissociation reactions.

The values of $E_B/N_B$ and $T_B$ vary depending on the application example. For improving the efficiency of the dissociation reactions proceeding in the intermediate region B, it would also be conceivable and possible to add to the source gas an additional gas (for example Ar, Kr or $N_2$), which does not react via ion-molecule reactions with the ions extracted into the intermediate region, but only serves as a collision partner.

In the event $H_2$ is used as the source gas, a selective $H_3^+$ ion current is generated. Herein ion-molecule reactions of the following type occur:

$$H_2^++H_2 \rightarrow H_3^++H$$

$$H^++H_2+H_2 \rightarrow H_3^++H_2$$

Due to the applied electric field, furthermore dissociation reactions proceed which predominate compared to the association reactions and through which the build-up of cluster ions is largely canceled, or their build-up is prevented from the outset:

$$H_3^+.H_2+H_2 \rightarrow H_3^++H_2+H_2$$

In the case of a mixture of $H_2$ and Ar being used as the source gas, a selective $H_3^+$ ion current is also generated (cf. ref3: Praxmarer et al., J. Chem. Phys. 100 (12), 8884–8889, 1994). In other source gas mixtures of $H_2$ with a pure gas X, whose proton affinity is less than that of $H_2$, as the source ionic species $H_3^+$ is also formed. If the proton affinity of the components X is greater than that of $H_2$, $XH^+$ ions are formed as the source ionic species.

In the case of $N_2$—$N_2O$ as the source gas mixture, the reaction conditions are selected such that a selective $O^-$ ion current is obtained (ref2).

The intermediate region B is already known from conventional methods and devices for obtaining a selective ion current (it corresponds to regions B and C of AT 001 637 U1 and AT 406 206 B) and is also referred to as "source drift region". The intermediate region B could also be divided into two subregions B1 and B2. In this case the source gas would be present in the region B1, but the electric field strength would be too low for dissociation reactions. In the adjoining region B2 a higher field strength would be present in order to bring about the dissociation reactions.

By applying an electric field, the ions formed of the one or several source ionic species is extracted into the reaction region C through an aperture opening 6 in a partitioning wall 7.

In the reaction region C an additional reactive collision partner, different from the source gas in its chemical composition, is added, which, within the scope of this document, is referred to as reactant gas. The reactant gas can be formed by a pure gas or a gas mixture. The total pressure in the reaction region C is more than 0.01 mbar (particle gas density $N_c$). The partial pressures of source gas and reactant gas vary as a function of the source and reactant gas utilized. The addition of the reactant gas takes place through a feed inlet 8 depicted schematically in the FIGURE. By means of electrodes 9 an electric field of field strength $E_C$ is applied. Reaction region C is at a temperature $T_C$.

Through ion-molecule reactions with the reactant gas the ion current extracted from the intermediate region B and preferably substantially comprised of the one or several source ionic species, is converted into an output ion current, which substantially, i.e. at more than 90%, preferably more than 95%, is comprised of a single ionic species. In practice values of up to more than 99% can be attained. If the ion current extracted from the intermediate region B is comprised of more than one source ionic species, the conversion into the output ion current comprised of substantially only a single ionic species, is successfully completed thereby that only a single production species results from the reactions of the various source ionic species with the reactant gas.

The parameters $E_C/N_C$ and $T_C$ define the reaction conditions. Expressed differently, by variation of these parameters it is possible to favor certain reaction channels and to suppress others in order to generate a selective output ion current of one ionic species. For example, through suitable selection of the field strength of field $E_C$ dissociation reactions can be brought about in order to cancel the build-up of cluster ions or to prevent their build-up from the outset. To improve the efficiency of such dissociation reactions, to the reaction region C an additional gas could also be added, which does not react with the ions present in the reaction region C via ion-molecule reactions but rather serves only as a collision partner.

The ions are conducted by the electric field $E_C$ through the reaction region C to the outlet 10.

Through the electrodes 5 in intermediate region B and/or through the electrodes 9 in reaction region C an electrostatic potential is preferably generated. It is here preferred that in intermediate region B and/or in reaction region C a homogeneous electric field $E_B$ or $E_C$, respectively, is generated. Due to the homogeneity of the electric field $E_B$ and $E_C$ respectively, the reaction conditions can be manipulated in advantageous manner, i.e. certain reaction channels can be favored or suppressed.

By changing the reactant gases, different selective output ion currents (i.e. output ion currents comprised substantially only of a single ionic species) can be generated simply and rapidly, which can be utilized for example as primary ions for chemical ionization methods. Such chemical ionization methods are employed for example in the ion-molecule reaction mass spectrometry (IMR-MS) or in proton transfer reaction mass spectrometry (PTR-MS). A sample gas to be analyzed is herein ionized by means of the output ion current in a drift tube and, subsequently, analyzed mass-spectrometrically. But the reaction region C remains substantially free of the sample gas to be analyzed, i.e. the partial pressure of the sample gas in the reaction region C is less than 1/10 of the partial pressure of the sample gas in the drift tube. Apart from the components of the source and reaction gas, in the reaction region C preferably less than 50 ppm of other reactive components (=reactive impurities) should be present (which, for example, are formed by back-flowing components of a sample gas to be analyzed), and a value of less than 25 ppm is especially preferred. In contrast, higher fractions of nonreactive components (for example nitrogen) can be present.

The ionic species at outlet 10 differs from the one or the several source ionic species.

If as source ionic species at the outlet of the intermediate region B $H_3^+$ ions are extracted, from these for example output ion currents can be generated, which each comprise substantially as a single ionic species the following ions: $N_2H^+$, $H_3O^+$, $NO^+$, $NH_4^+$. Reactant gases, which react with the $H_3^+$ ion current from the intermediate region B to form the particular single ionic species forming the output ion current are:

| | |
|---|---|
| nitrogen ($N_2$): | $H_3^+ + N_2 \rightarrow N_2H^+ + H_2$ |
| resulting selective output ion current: | $N_2H^+$ |
| water ($H_2O$): | $H_3^+ + H_2O \rightarrow H_3O^- + H_2$ |
| resulting selective output ion current: | $H_3O^+$ |
| nitrogen monoxide (NO): | $H_3^+ + NO \rightarrow HNO^+ + H_2$ |
| | $HNO^+ + NO \rightarrow NO^+ + HNO$ |
| resulting selective output ion current: | $NO^+$ |
| ammonia ($NH_3$): | $H_3^+ + NH_3 \rightarrow NH_4^+ + H_2$ |
| resulting selective ion current: | $NH_4^+$ |

A selective $OH^-$ output ion current can be obtained from the $O^-$ ion current extracted from intermediate region B by means of the reactant gases methane ($CH_4$) or $H_2$:

$$O^- + CH_4 \rightarrow OH^- + CH_3$$

$$O^- + H_2 \rightarrow OH^- + H$$

If as the source ionic species $XH^+$ ions are present, X being a component of the source gas, whose proton affinity is greater than $H_2$, then with $N_2$ as the reactant gas the output ion current $N_2H^+$ is formed, if the proton affinity of component X is less than that of $N_2$. If the proton affinity of X is lower than the proton affinity of $H_2O$, with $H_2O$ as reactant gas $H_3O^+$ is formed as substantially the single ionic species of the output ion current.

It would in principle also be conceivable and possible that the intermediate region B is omitted. The reactions of the ions formed in the ionization region to yield the source ionic species not reacting with the source gas or the several source ionic species not reacting with the source gas, could in this case either substantially proceed completely already in the ionization region and/or after the extraction of the (reacted not at all or only partially to the one or several source ionic species) ions from the ionization region into the reaction region C could continue in the latter due to the obtaining partial pressure of source gas. Therein such conditions should be present that the reactant gas does not react with the precursor products of the one or several source ionic species and/or precursor products reacting with the reactant gas are allowed to react with a suitable addition gas to yield non-impurity ions.

Even with an available intermediate region B it would be conceivable and possible that the completion of the reactions into the one or several source ionic species first takes place in the reaction region C.

Consequently, the regions A and B can at least partially overlap or regions B and C can partially overlap, as long as B does not overlap A. In any case, the reaction region C is located outside of the ionization region A (i.e. outside of the region in which the plasma generated in the ionization of the source gas is located). The reaction region C is consequently spatially separated from ionization region A and a back-flow of reactant gas from reaction region C into the ionization region A is substantially prevented.

As is evident on the basis of the above description, the scope of the invention is not limited to the described embodiment examples, but rather should be determined with reference to the enclosed claims together with its full range of possible equivalents. While the preceding description and the drawing represent the invention, it is obvious to a person skilled in the art that various changes can be carried out without leaving the true spirit and scope of the invention.

LEGEND TO THE REFERENCE NUMBERS

1 Feed inlet
2 Ionization device
3 Aperture opening
4 Partitioning wall
5 Electrode
6 Aperture opening
7 Partitioning wall
8 Feed inlet
9 Electrode
10 Outlet

The invention claimed is:

1. Method for obtaining an output ion current substantially comprised of only a single ionic species, in which ions formed in the ionization of a source gas in an ionization region (A) and/or ions extracted from the ionization region (A) are allowed to react in a region (A, B, C) in which source gas is located, until substantially only one or several source ionic species are present, which do not react with the source gas, in which furthermore to a reaction region (C), located outside of the ionization region (A) and in which ions of the one or several source ionic species are present, a reactant gas, differing from the source gas, is supplied, which reacts with the ions of the one or several source ionic species, the ions of the one or several source ionic species being substantially converted into the single ionic species forming the output ion current.

2. Method as claimed in claim 1, in which a back-flow of the reactant gas from the reaction region (C) into the ionization region (A) is substantially prevented.

3. Method as claimed in claim 1, in which the ions extracted from the ionization region (A) are conducted into an intermediate region (B), in which they are left until through ion-molecule reactions with the source gas, present in the intermediate region, also the ions initially still different from the one or several source ionic species are substantially converted into ions of the one or several source ionic species or cluster ions thereof.

4. Method as claimed in claim 3, in which ions of the one or several source ionic species are cluster ions thereof are extracted from the intermediate region (B) into the reaction region (C).

5. Method as claimed in claim 1, in which the ions extracted from the ionization region are conducted directly into the reaction region (C).

6. Method as claimed in claim 1, in which to the reaction region (C) the source gas is also supplied.

7. Method as claimed in claim 1, in which at least in a section adjacent to the outlet of the reaction region (C) an electric field (Ec) is applied of a strength through such that the build-up of cluster ions from the ionic species of the output ion current is prevented or canceled.

8. Method as claimed in claim 1, in which in at least a section adjacent to the outlet of the intermediate region (B) an electric field ($E_B$) is applied of a strength such that the build-up of cluster ions from the one or several source ionic species is prevented or canceled.

9. Method as claimed in claim 1, in which only one source ionic species is formed.

10. Method as claimed in claim 1, in which in the region (A, B, C) in which the ions formed in the ionization region (A) and/or the ions extracted from the ionization region (A) are allowed to react to form the one or several source ionic species, source gas is present at a pressure of at least 1 Pascal.

11. Method as claimed in claim 1, in which for obtaining output ion currents, comprised in each instance substantially of only one single ionic species, which differ in ionic species, to the reaction region (C), depending on the ionic species of the output ion current, different reactant gases are supplied, and, before the supply of a particular reactant gas, the reaction region (C) is pumped down to remove the previously used different reactant gas.

12. Method as claimed in claim 7, in which the electric field ($E_C$) applied in the reaction region (C) is electrostatic and homogeneous.

13. Method as claimed in claim 8, in which the electric field ($E_B$) applied in the intermediate region (B) is electrostatic and homogeneous.

* * * * *